US006547882B1

(12) United States Patent
Bohle

(10) Patent No.: US 6,547,882 B1
(45) Date of Patent: Apr. 15, 2003

(54) DRUM COATER WITH FORCED RECIRCULATION OF THE MATERIAL

(75) Inventor: Lorenz Bernhard Bohle, Ennigerloh (DE)

(73) Assignee: L. B. Bohle Maschinen + Verfahren GmbH, Ennigerloh (DE)

( * ) Notice: Subject to any disclaimer, the term of this patent is extended or adjusted under 35 U.S.C. 154(b) by 0 days.

(21) Appl. No.: 09/600,691

(22) PCT Filed: Jan. 28, 1999

(86) PCT No.: PCT/DE99/00236

§ 371 (c)(1),
(2), (4) Date: Jul. 21, 2000

(87) PCT Pub. No.: WO99/38607

PCT Pub. Date: Aug. 5, 1999

(30) Foreign Application Priority Data

Jan. 28, 1998 (DE) .......................................... 198 03 113

(51) Int. Cl.⁷ ................................................. B05C 5/00
(52) U.S. Cl. ......................... 118/303; 118/418; 118/19; 366/225
(58) Field of Search ................................. 118/417, 418, 118/19, 28, 303; 366/225, 227, 228, 229

(56) References Cited

U.S. PATENT DOCUMENTS 4,973,167 A * 11/1990 Zmarliccki ................. 366/228

FOREIGN PATENT DOCUMENTS

| EP | 0 238 028 | 3/1987 |
| EP | 0 744 212 | 11/1996 |
| FR | 1 459 246 | 2/1967 |
| GB | 2 060 421 | 5/1981 |

OTHER PUBLICATIONS

English Translation of the Abstract of EP–0744212.*

* cited by examiner

Primary Examiner—Richard Crispino
Assistant Examiner—Yewebdar T Tadesse
(74) Attorney, Agent, or Firm—Merchant & Gould P.C.

(57) ABSTRACT

The invention relates to a device for depositing a surface coating on cores. The inventive device comprises a rotationally mounted drum for accommodating the cores, at least one spraying nozzle for depositing the surface material on the cores, a heating device for the inner space of the drum, an inlet and an outlet, and carriers which are provided for the cores and which are arranged inside said drum. The invention provides that the drum is designed as a longish cylinder and that second carriers are provided for the cores (11, 12). The second carriers transport the cores opposite the first carriers and are arranged such that they can be radially displaced in relation to the first carriers. The invention also provides that the drum is held in the device so that it can be quickly removed.

5 Claims, 3 Drawing Sheets

DRUM COATER WITH FORCED RECIRCULATION OF THE MATERIAL

Figure 1:
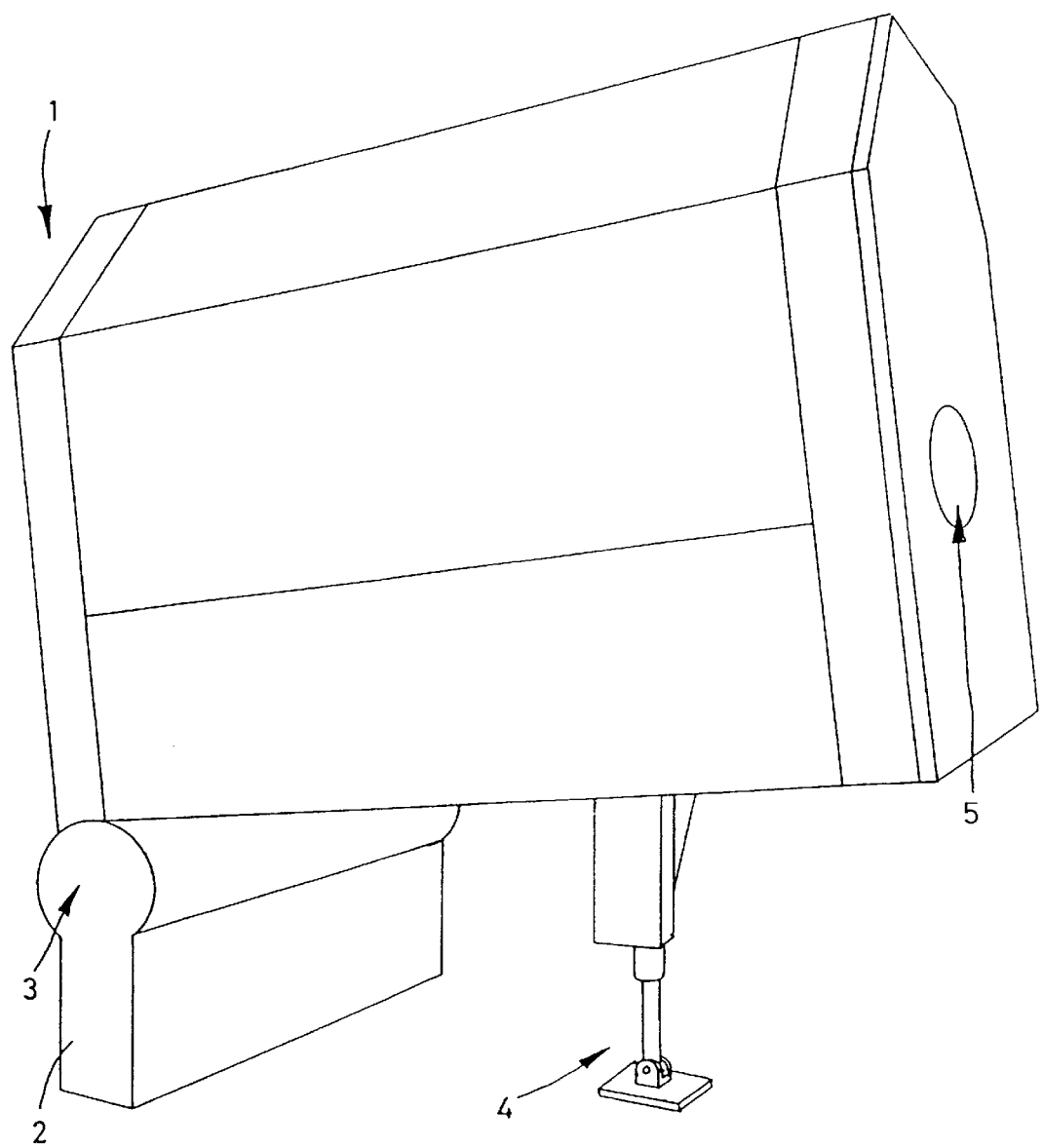

The invention concerns an apparatus for applying a surface coating to cores.

A device of this type is known from EP-A-0 744 212.

In practical operation, in the case of the known device, in particular in the case of oblong shaped items, not to be excluded is that these items that frequently display rectilinear lateral surface have contact with one another over a longer line, or even over a greater area. With the circulating movement of the product inside the drum, the fluidly applied coating in the case of this type of intensive contact of two adjacent items can lead to their adhering to each other, in particular since, in practice, frequently found within the circulated product is a "dead zone" in the center of the product, inside of which the items are hardly moved. In the case of the known device, to minimize this region the drum is embodied with an axial length that is greater than to the diameter of the drum, so that obtained overall is an oblong cylinder. By means of this oblong embodiment, the product is distributed over a greater length of the cylinder, so that the circulated bed of the product displays at its interior a small "dead zone."

Known from FR-A-1 459 246 is a coating apparatus whose drum displays first carriers that do not impart to the product any forward feed in the axial direction of the drum, hence produce no axial transport, rather transporting the product exclusively transversely to the axis of the drum in a rotary movement about the drum axis, hence in the form of a circulation or circumferential transport. Second carriers are provided spaced inwardly out from the drum wall and produce an axial transport of the product inside the drum in the longitudinal direction of the drum. Since the drum is disposed horizontally, axial transport of the coating product is effected exclusively through the second carriers.

The object of the invention is to improve an apparatus of this genre such that it assures as thorough as possible circulation of the product.

The object of the invention is met through an apparatus with a rotatably mounted drum for accepting the cores, with at least one spray nozzle for deposit of the surface material onto the core, as well as with a heating device for the inside space of the drum, as well as with an inlet and an outlet opening, as well as with canters arranged in the drum cores, characterized by the fact that the drum (7) is embodied as an oblong cylinder, and that second carriers (12) are provided for the cores, which transport the cores in a direction opposed to the direction of the first carriers (11), and that are radially offset relative to the first carriers (11), and that the drum (7) is journaled in the apparatus (1) in quickly removable fashion.

In other words, additionally to the first carriers lying inside at the pheriphery of the drum, which transport the product in one direction along the longitudinal axis of the drum, the invention proposes to provide opposed-acting second carriers that are not arranged alternately but rather are radially offset, for example further toward the interior of the drum. Since these carriers are supported on brackets against the drum wall, the product can be transported under these carriers along the drum wall by the first carriers. However, the regions of the product having a greater layer thickness are picked up by the second carriers, and since these second carriers act in opposed fashion with the first carriers a more intensive, thorough mixing of the bed is effected, so that a "dead zone" can be minimized, and, depending upon the geometry of the carriers and the drum, can be practically regularly excluded, namely if the coating results yield no items stuck together.

Designated as cylinders within the idea of this invention are not only drum shapes with a circular cross section, but also with a polygonal, for example an octagonal cross section.

The drum can advantageously be planned to be removably mounted in the apparatus. In this manner, even in operation of the apparatus with only one drum, a high degree of system availability can be assured, namely in that a soiled drum, even in the case of considerable expense and correspondingly great time requirement, can be replaced within a short time with a cleaned drum. Hence, the cleaning times, with comparatively low financial expense through procurement of a single replacement drum, do not correspond to the down times of the entire apparatus, so that, all together, the apparatus can be operated with considerably improved economy.

The drum can advantageously be planned to be tiltably supported in its longitudinal axis so that it can be operated in a slanted arrangement. In this manner, automatically assured is that the items inside the drum will be optimally, thoroughly mixed and again always picked up by the carriers and moved through each other.

Advantageously, the first, upwardly-transporting carriers in the case of this type of diagonal operation of the drum can be arranged, in a manner known per se, along the drum wall, while the second, opposed-transporting carriers are supported against the drum wall, and are correspondingly radially further inside. In this way, the drum, in a manner known per se, can be embodied in more price-favorable fashion, and the second carriers can be added later.

With corresponding space planning, the apparatus can advantageously display several drums that operate connected one after another, so that the individual coating steps can run off after one another in a drum that is special for each step. In this manner, optimal treatment conditions can be set in the individual drums; the degree of soiling of each one of the drums can be correspondingly reduced.

Figure 2:
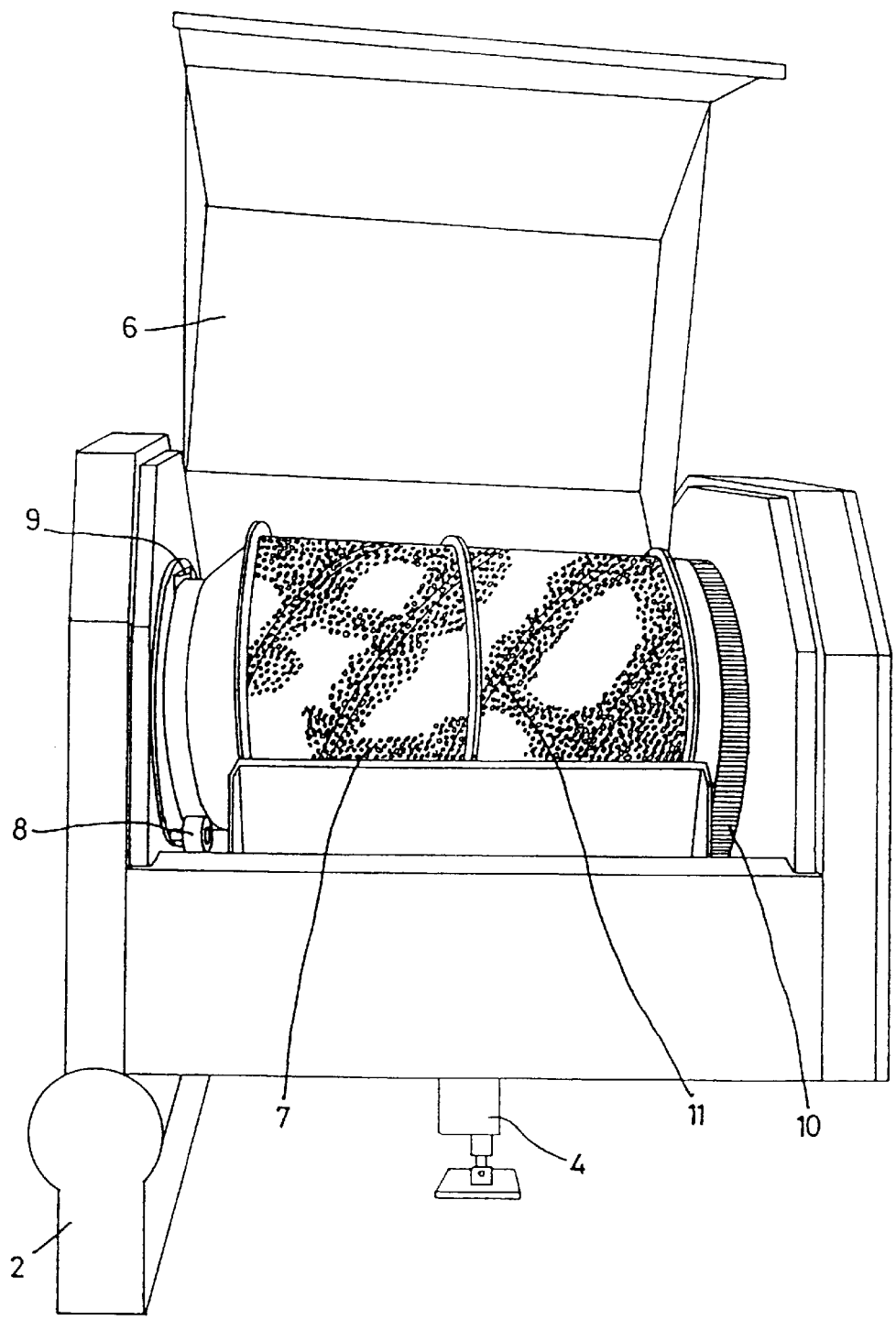

An example of embodiment of the invention will be described in more detail in the following with the aid of the drawings. Shown are:

FIG. 1 a perspective view of an apparatus with closed covering hood,

FIG. 2 the apparatus of FIG. 1 with open covering hood, and

Figure 3:
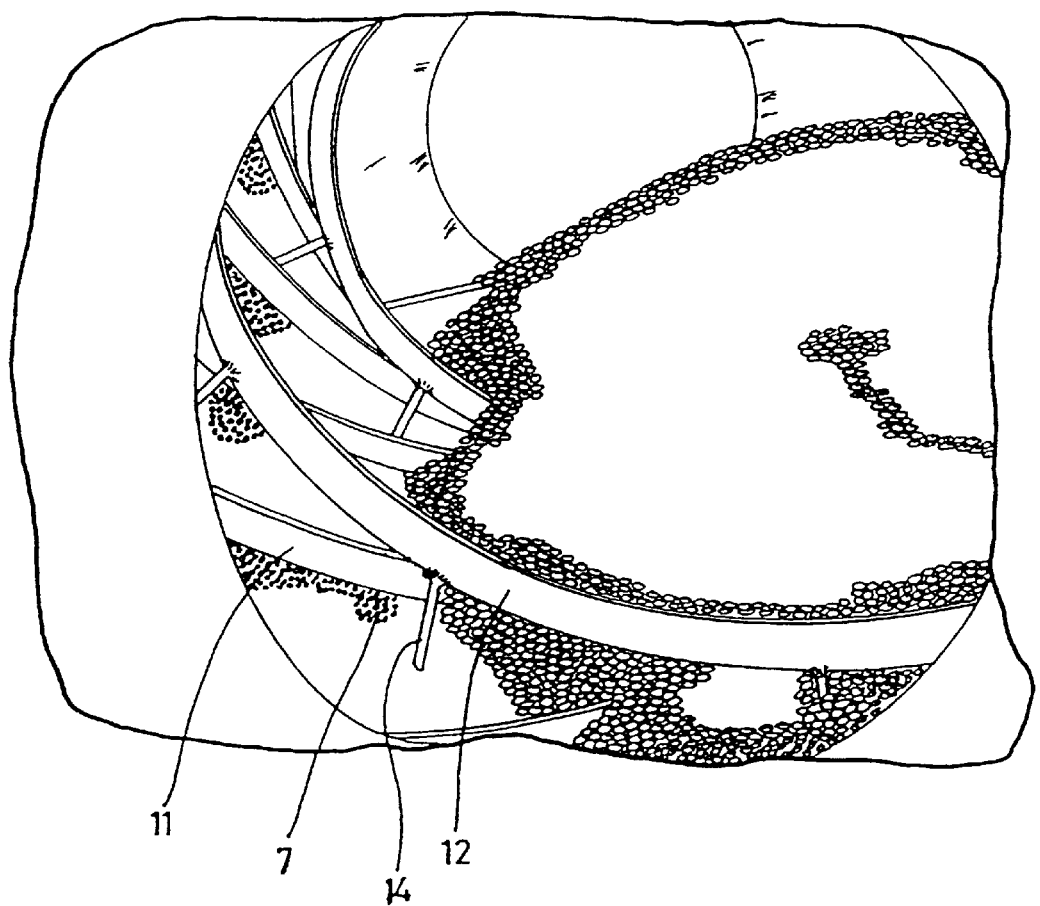

FIG. 3 a view axially into the interior of the drum.

Denoted generally with 1 in FIG. 1 is an apparatus that is designated as a "Drum Coater." The apparatus 1 displays a support foot 2 on which it is disposed in tiltably moveable fashion about a tilt axis 3. The tilting movement is made possible through a hydraulic, telescoping support 4. An inlet opening 5 is provided on the front side of the apparatus 1; it also serves as an outlet opening.

Seen from FIG. 2 is that the apparatus displays a swingable covering hood 6 under which is provided a drum 7. With its one end, the drum 7 rests on rollers 8, with limit rollers 9 also being provided on the front side. On its other end, the drum 7 displays a gear ring 10 through which the drum can be driven in rotating fashion. Along its cylindrical circumference, the drum is made of previous material, for example a perforated sheet metal. First carriers 11 are provided as a single or multiple spiral, and attached directly to the drum wall.

Seen from FIG. 2 is that provided additionally to the first carriers 11 are second carriers 12, which are likewise embodied as spirals whose lead, however, runs opposite to that of the carriers 11. The second carriers 12 are attached on brackets 14, at a distance from the drum wall, and therefore lie radially inside the first carriers 11.

What is claimed is:

1. An apparatus for applying a surface coating to cores comprising:
    a rotatably mounted drum for accepting the cores;
    at least one spray nozzle for deposit of the surface material onto the core;
    a heating device for the inside space of the drum;
    an inlet and an outlet opening; and
    at least one first and at least one second carrier arranged in the drum,
    wherein said drum is an oblong cylinder, wherein said at least one second carrier transports the cores in a direction opposed to the direction of said at least one first carrier, and wherein said at least one second carrier is radially offset, and further toward the interior of the drum relative to said at least one first carrier, and wherein the drum is journaled in the apparatus in a quickly removable fashion.

2. The apparatus of claim 1, wherein the drum is mounted in tiltable fashion, and is capable of being driven in an arrangement of its longitudinal axis that is slanted relative to the horizontal.

3. The apparatus of claim 2, wherein the at least one first carrier is arranged in an upwardly transporting manner, and disposed radially outside of the at least one second carrier.

4. The apparatus of claim 1, further comprising at least two drums.

5. The apparatus of claim 4, wherein said at least two or more drums are provided axially behind each other, with closable passages being provided between each two adjacent drums.

* * * * *